(12) United States Patent
Alpert et al.

(10) Patent No.: US 12,294,985 B2
(45) Date of Patent: May 6, 2025

(54) CHANNEL AWARE APPLICATION DATA TRANSMISSION FOR BLE DEVICES

(71) Applicant: TEXAS INSTRUMENTS INCORPORATED, Dallas, TX (US)

(72) Inventors: Yaron Alpert, Hod Hasharon (IL); Maxim Altshul, Hod Hasharon (IL); Maital Hahn, Petach-Tikva (IL); Chia-Jung Lee, Kolsaas (NO)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 350 days.

(21) Appl. No.: 17/387,692

(22) Filed: Jul. 28, 2021

(65) Prior Publication Data
US 2023/0029978 A1    Feb. 2, 2023

(51) Int. Cl.
*H04W 72/12*    (2023.01)
*H04W 4/80*    (2018.01)
*H04W 72/1263*    (2023.01)

(52) U.S. Cl.
CPC ....... *H04W 72/12* (2013.01); *H04W 72/1263* (2013.01); *H04W 4/80* (2018.02)

(58) Field of Classification Search
CPC ... H04W 72/12; H04W 72/1263; H04W 4/80; H04W 84/18
See application file for complete search history.

(56) References Cited

U.S. PATENT DOCUMENTS

| | | | | |
|---|---|---|---|---|
| 2008/0161031 A1* | 7/2008 | Tu | ..................... | H04W 72/1215 455/512 |
| 2008/0311852 A1* | 12/2008 | Hansen | ................ | H04W 88/06 455/41.2 |
| 2009/0154433 A1* | 6/2009 | Jang | ...................... | H04W 92/02 370/338 |
| 2010/0041336 A1* | 2/2010 | Oestergren | ............ | G06F 15/163 711/E12.001 |
| 2018/0295660 A1* | 10/2018 | Choi | ..................... | H04W 8/005 |
| 2018/0368192 A1* | 12/2018 | Arditti Ilitzky | ....... | H04L 1/0044 |
| 2021/0168828 A1* | 6/2021 | Desai | .................... | H04W 76/16 |

OTHER PUBLICATIONS

Bluetooth, "Bluetooth Core Specification," Revision: v5.2, Dec. 31, 2019, Link Layer Specification, Section 4.5.1 Connection Events, pp. 2980-2981.
Bluetooth, "Bluetooth Core Specification," Revision: v5.2, Dec. 31, 2019, Link Layer Specification, Section 4.5.6 Closing Connection Events, p. 2986.

* cited by examiner

*Primary Examiner* — Gary Mui
*Assistant Examiner* — Yewon Kim
(74) *Attorney, Agent, or Firm* — Michelle F. Murray; Frank D. Cimino

(57) ABSTRACT

A device (e.g., a BLUETOOTH device) includes memory and one or more processors coupled to the memory. The one or more processors are configured to implement a BLUETOOTH host, a BLUETOOTH host-controller interface, and a BLUETOOTH controller. The one or more processors are further configured to cause the BLUETOOTH controller to receive, from the BLUETOOTH host via the BLUETOOTH host-controller interface, a message indicating first channel and timing information for sending data corresponding to a BLUETOOTH application. The one or more processors are further configured to cause the BLUETOOTH controller to initiate sending the data based on the first channel and timing information.

25 Claims, 4 Drawing Sheets

CHANNEL AWARE APPLICATION DATA TRANSMISSION FOR BLE DEVICES

CROSS-REFERENCE TO RELATED APPLICATIONS

The present application relates to expired U.S. Provisional Patent Application No. 62/906,512, which was filed Sep. 26, 2019, is titled "Channel Aware Application Data Transmission For BLE Devices," and is hereby incorporated herein by reference in its entirety.

SUMMARY

In accordance with at least one example of the disclosure, a device (e.g., a BLUETOOTH device) includes memory and one or more processors coupled to the memory. The one or more processors are configured to implement a BLUETOOTH host, a BLUETOOTH host-controller interface, and a BLUETOOTH controller. The one or more processors are further configured to cause the BLUETOOTH controller to receive, from the BLUETOOTH host via the BLUETOOTH host-controller interface, a message indicating first channel and timing information for sending data corresponding to a BLUETOOTH application. The one or more processors are further configured to cause the BLUETOOTH controller to initiate sending the data based on the first channel and timing information.

In at least some examples, the one or more processors are further configured to cause the BLUETOOTH host to pull, from the BLUETOOTH controller using dedicated signaling, second channel and timing information of one or more scheduled transmissions.

In at least some examples, the one or more processors are further configured to cause the BLUETOOTH host or the BLUETOOTH application to determine the first channel and timing information based on the second channel and timing information.

In at least some examples, the second channel and timing information specifies, for each scheduled transmission of the one or more scheduled transmissions, a channel to be used for the scheduled transmission, a start time of the scheduled transmission, or a duration of the scheduled transmission.

In at least some examples, the one or more processors are configured to cause the BLUETOOTH host or the BLUETOOTH application to determine the first channel and timing information to avoid conflict with the one or more scheduled transmissions based on the second channel and timing information.

In at least some examples, the one or more processors are further configured to cause the device to transmit an indication that the first device plans to transmit the data according to the first channel and timing information.

In at least some examples, the one or more processors are configured to cause the BLUETOOTH controller to implement a resource manager that maps transmission of the data to the first channel and timing information.

In at least some examples, a device (e.g., a BLUETOOTH device) comprises memory and one or more processors coupled to the memory. The one or more processors are configured to implement a BLUETOOTH host, a BLUETOOTH host-controller interface, and a BLUETOOTH controller. The one or more processors are further configured to cause the BLUETOOTH controller to receive, from the BLUETOOTH host via the BLUETOOTH host-controller interface, a message requesting to send first data for a BLUETOOTH application according to first channel and timing information. The one or more processors are further configured to determine whether to approve sending the first data according to the first channel and timing information. The one or more processors are further configured to send, to the BLUETOOTH host via the BLUETOOTH host-controller interface, an indication of whether the BLUETOOTH controller approves sending the first data according to the first channel and timing information.

In at least some examples, the one or more processors are further configured to cause the BLUETOOTH host to pull, from the BLUETOOTH controller using dedicated signaling, second channel and timing information of one or more scheduled transmissions.

In at least some examples, the one or more processors are further configured to cause the BLUETOOTH host or the BLUETOOTH application to determine the first channel and timing information based on the second channel and timing information.

In at least some examples, the second channel and timing information specifies, for each scheduled transmission of the one or more scheduled transmissions, a channel to be used for the scheduled transmission, a start time of the scheduled transmission, and a duration of the scheduled transmission.

In at least some examples, the one or more processors are configured to cause the BLUETOOTH host or the BLUETOOTH application to determine the first channel and timing information to avoid conflict with the one or more scheduled transmissions based on the second channel and timing information.

In at least some examples, the one or more processors are further configured to cause the BLE controller to schedule transmission of the data according to the first channel and timing information when the BLUETOOTH controller approves sending the data according to the first channel and timing information.

In at least some examples, a method includes receiving, by a BLUETOOTH controller of a BLUETOOTH device from a BLUETOOTH host of the BLUETOOTH device via a BLUETOOTH host-controller interface of the BLUETOOTH device, a message indicating first channel and timing information for sending data corresponding to a BLUETOOTH application. The method further includes initiating, by the BLUETOOTH controller, sending the data based on the first channel and timing information.

In at least some examples, the method further includes pulling, by the BLUETOOTH host from the BLUETOOTH controller using dedicated signaling, second channel and timing information of one or more scheduled transmissions.

In at least some examples, the method further includes determining, by the BLUETOOTH host, the first channel and timing information based on the second channel and timing information.

In at least some examples, the second channel and timing information specifies, for each scheduled transmission of the one or more scheduled transmissions, a channel to be used for the scheduled transmission, a start time of the scheduled transmission, and a duration of the scheduled transmission.

In at least some examples, the method further includes determining, by the BLUETOOTH host, the first channel and timing information to avoid conflict with the one or more scheduled transmissions based on the second channel and timing information.

In at least some examples, the method further includes transmitting, by the BLUETOOTH device, an indication that the BLUETOOTH device plans to transmit the data according to the first channel and timing information.

In at least some examples, the method further includes mapping, by the BLUETOOTH controller, the data to the first channel and timing information.

BRIEF DESCRIPTION OF THE DRAWINGS

For a detailed description of various examples, reference will now be made to the accompanying drawings in which.

DETAILED DESCRIPTION

Figure 1:
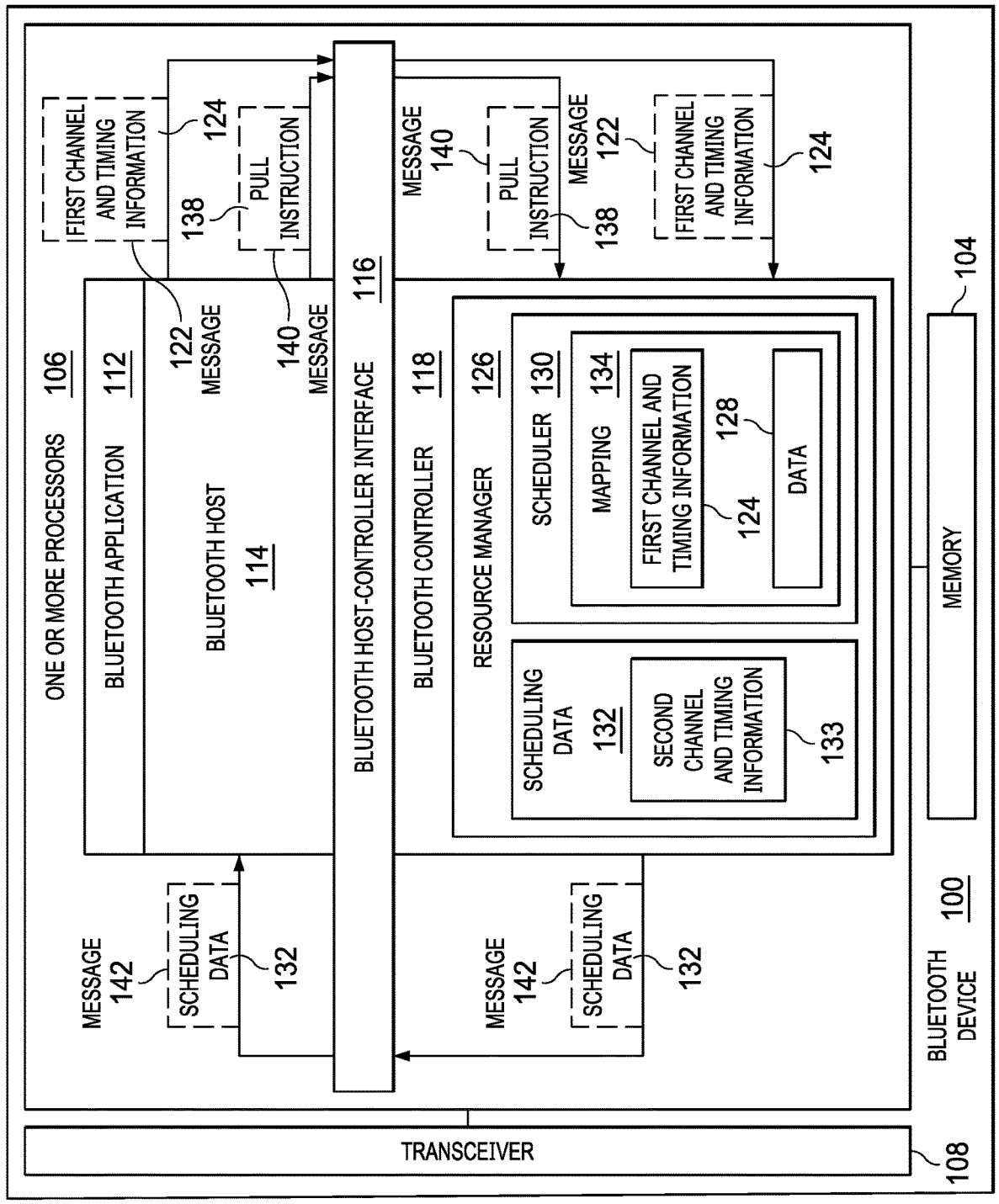
FIG. 1 is a block diagram of a BLUETOOTH device in accordance with various examples.

The BLUETOOTH (BT) Low Energy (BLE) standard defines a standard hierarchy of components. The bottom layer is the BLE controller while the top layer is the BLE host. On top of the BLE controller and BLE host resides the BLE application. The BLE controller handles all tasks required for a connection to stay active. This includes hopping between channels using a preconfigured channel list. BLE devices communicate at constant intervals on channels known as BLE data channels. Each data channel has a unique band between 2.4 gigahertz (GHz) and 2.4835 GHz and thus each of those channels has unique characteristics. In order for a BLE application/host to achieve custom, per channel behavior, it is required for the BLE application/host to be aware of channel/timing information. As of today, the BT/BLE standard application/host is not aware of specific channel used or plan to be used and the specific timing (start time of use and duration) information of ongoing or incoming transmission content. Therefore, there is no BT/BLE host/application methodology that enables awareness (getting this channel/timing info) and correlation between a transmission of a specific packet/information element (data or other) and a specific channel/timing of ongoing or incoming transmission content.

Examples described herein provide the BLUETOOTH (e.g., BLE) host and/or BLUETOOTH application awareness of when, and on what channel, data will be sent using the BLUETOOTH controller. This is accomplished by the BLUETOOTH host sending (e.g., responsive to an instruction from the BLUETOOTH application) an instruction or request for the BLUETOOTH controller to send data at a particular frequency (channel) and time (event timing). In some implementations, the BLUETOOTH host and/or BLUETOOTH application sends an instruction for the BLUETOOTH controller to send the data at the particular frequency (channel) and time, and the BLUETOOTH controller complies. In these examples, since the BLUETOOTH controller automatically complies with the BLUETOOTH host's and/or the BLUETOOTH application's instruction to send the data at the particular channel and time, the BLUETOOTH host and/or the BLUETOOTH application are aware of the channel and timing information at which the data will be sent by virtue of the BLUETOOTH host sending the instruction to the BLUETOOTH controller to send the data according to the channel and timing information. In other examples, the BLUETOOTH host and/or the BLUETOOTH application sends a request for the BLUETOOTH controller to send the data at a particular frequency and time. In these examples, the BLUETOOTH controller determines whether to approve the request from the BLUETOOTH host and/or the BLUETOOTH application to send the data at the particular frequency and time, either approves or denies the request, and sends the BLUETOOTH host an indication of whether the request is approved or denied. In these examples, the BLUETOOTH host and/or the BLUETOOTH application are aware of the channel and timing information at which the data will be sent based on the approval/denial response from the BLUETOOTH controller.

Additionally, in some examples, the BLUETOOTH host and/or the BLUETOOTH application receive channel and timing information of scheduled transmission from the BLUETOOTH controller in advance of the BLUETOOTH host and/or the BLUETOOTH application sending the instruction or request for the BLUETOOTH controller to send data at the particular frequency and time. This enables the BLUETOOTH host and/or the BLUETOOTH application to instruct or request the BLUETOOTH controller to send the data at a particular frequency and time at which the frequency is available, as indicated by the BLUETOOTH controller.

Additionally, in some examples, the BLUETOOTH device transmits the channel and timing information at which the BLUETOOTH controller is going to send or receive data to a second device so that a second (e.g., receiving) device can learn the frequency and time at which the data will be sent. This enables the receiving device to know at what frequency and time the receiving device should look for the data, thereby synchronizing the two devices.

FIG. 1 is a block diagram of a BLUETOOTH (e.g., BLE) device 100 (e.g., a device configured with BLUETOOTH communication capability) according to some examples of this disclosure in which a BLUETOOTH host 114 is configured to communicate with a BLUETOOTH controller 118 (e.g., in response to instruction from a BLUETOOTH application 112) to instruct the BLUETOOTH controller 118 to send data 128 of the BLUETOOTH application 112 according to first channel and timing information 124. The BLUETOOTH device 100 includes a transceiver 108, memory 104, and one or more processors 106 coupled to the transceiver 108 and the memory 104.

The one or more processors 106 are configured to implement the BLUETOOTH host 114, a BLUETOOTH host-controller interface 116, and the BLUETOOTH controller 118. The one or more processors 106 may include one or more chips. For example, the one or more processors 106 may include a first chip in which the BLUETOOTH host 114, BLUETOOTH controller 118, and BLUETOOTH host-controller interface 116 are implemented, and a second chip in which the BLUETOOTH application 112 is implemented. Alternatively, the one or more processors may implement the BLUETOOTH host 114, the BLUETOOTH controller 118, the BLUETOOTH host-controller interface 116, and the BLUETOOTH application 112 on a single chip.

The BLUETOOTH application 112 may be any application configured to use BLUETOOTH. The BLUETOOTH application 112 may be above the BLUETOOTH host 114 according to the BLUETOOTH hierarchy of components. The BLUETOOTH application 112 may be configured to send the data 128 to one or more other devices.

The BLUETOOTH host 114 may be above the BLUETOOTH host-controller interface 116 according to the BLUETOOTH hierarchy of components. The BLUETOOTH host 114 is configured to send a message 122 to the BLUETOOTH controller 118 via the BLUETOOTH host-controller interface 116. The message 122 indicates the first channel and timing information 124 for sending the data 128 corresponding to the BLUETOOTH application 112. For example, the first channel and timing information 124 may specify a particular data channel (e.g., frequency) on which to send the data 128, and may specify a particular time at which to send the data 128 on the particular data channel. In some examples, the first channel and timing information 124 in the message 122 is derived from channel and timing information provided to the BLUETOOTH host 114 from the BLUETOOTH application 112. For example, the BLUETOOTH application 112 may send a message (not illustrated) to the BLUETOOTH host 114 that indicates that the BLUETOOTH application 112 would like to send the data at the particular time and on the particular channel.

The BLUETOOTH controller 118 may be below the BLUETOOTH host 114 according to the BLUETOOTH hierarchy of components, and may be configured to communicate with the BLUETOOTH host 114 via the BLUETOOTH host-controller interface 116 (e.g., as described in the BLUETOOTH Core Specification v 5.2). The BLUETOOTH controller 118 is configured to receive the message 122 from the BLUETOOTH host 114 via the BLUETOOTH host-controller interface 116. The BLUETOOTH controller 118 is further configured to initiate sending the data 128 based on the first channel and timing information 124. In some examples, initiating sending the data 128 based on the first channel and timing information 124 includes initiating sending the data 128 such that the data 128 is sent on the channel, and at the time, indicated in the first channel and timing information 124.

In some examples, initiating sending the data 128 based on the first channel and timing information 124 includes scheduling transmission of the data 128 according to the first channel and timing information 124. For instance, in the example illustrated in FIG. 1, the BLUETOOTH controller 118 includes a resource manager 126 (e.g., a baseband resource manager) responsible for scheduling transmission of packets (and the BLUETOOTH controller 118 may receive a corresponding response). In the example illustrated in FIG. 1, the resource manager 126 includes a scheduler 130 responsible for scheduling data (e.g., the data 128) for transmission on a particular channel and at a particular time based on the first channel and timing information. In the example illustrated in FIG. 1, in order to schedule the data 128 for transmission based on the first channel and timing information, the scheduler 130 is configured to receive the first channel and timing information and map the data 128 to a particular frequency and transmission time indicated by the first channel and timing information. For example, the scheduler 130 is configured to generate and/or store a mapping 134 that maps the data 128 to the particular frequency and transmission time indicated by the first channel and timing information.

Initiating sending the data 128 according to the first channel and timing information 124 may further include the scheduler 130 (or the resource manager 126) providing a signal (e.g., a scheduler signal) configured to cause the BLUETOOTH controller 118 to cause the transceiver 108 to transmit the data 128 at the particular time and on the particular frequency corresponding to the first channel and timing information. For example, the scheduler signal may identify or correspond to the particular frequency indicated in the mapping 134, and may be output by the scheduler 130 (e.g., to another component in the Link Layer of the BLUETOOTH controller 118) at a time (or in a sequential order relative to other scheduled transmissions) configured to cause the BLUETOOTH controller 118 to cause the BLUETOOTH controller 118 to cause the transceiver 108 to transmit the data 128 at the particular time indicated in the mapping 134.

The BLUETOOTH controller 118 is configured to generate a packet including the data 128 and subsequently cause the transceiver 108 to transmit the data 128 on the particular frequency and at the transmission time based on the scheduler signal using any technique, such as the transmission process described in BLUETOOTH Core Specification v 5.2.

In some examples, the BLUETOOTH controller 118 is further configured to send the BLUETOOTH host 114 a message [not illustrated] indicating whether the event (e.g., transmission of the data 128) was conducted successfully or unsuccessfully.

Accordingly, the BLUETOOTH controller 118 in FIG. 1 is configured to transmit the data 128 according to the first channel and timing information 124 instructed by the BLUETOOTH host 114 (and in some examples additionally based on an instruction from the BLUETOOTH application 112). Since the BLUETOOTH controller 118 transmits the data 128 according to the first channel and timing information 124 instructed by the BLUETOOTH host 114 (and in some examples additionally based on an instruction from the BLUETOOTH application 112), the BLUETOOTH host 114 (and in some examples the BLUETOOTH application 112) is/are aware of channel and timing information that will be used to transmit the data 128. The BLUETOOTH host 114 (and in some examples) being aware of the channel and timing information that will be used to transmit the data 128 enables the BLUETOOTH host 114 and/or BLUETOOTH application 112 to provide channel and timing information to one or more other devices, which may use the channel and timing information to perform services. For example, the BLUETOOTH host and/or BLUETOOTH application 112 may be configured to provide the first channel and timing information 124 to one or more other devices as described below with reference to FIG. 3.

Additionally or alternatively, in some examples, the one or more processors 106 are further configured to cause the BLUETOOTH host 114 to obtain, from the BLUETOOTH controller 118, second channel and timing information 133 of one or more scheduled transmissions. For example, the scheduler 130 may maintain scheduling data 132 that includes the second channel and timing information 133, and the second channel and timing information 133 may include scheduling information of scheduled transmissions that indicates a frequency of each scheduled transmission, a time at which each scheduled transmission will begin, and/or a duration of each scheduled transmission. In some of these examples, the BLUETOOTH controller 118 is configured to send a message 142 to the BLUETOOTH host 114 that includes the scheduling data 132 (and the second channel and timing information 133). In some of these examples, the BLUETOOTH host 114 is configured to send the scheduling data 132 to the BLUETOOTH application 112.

In some examples in which the one or more processors 106 are configured to cause the BLUETOOTH host 114 to obtain the second channel and timing information 133 from the BLUETOOTH controller 118, the BLUETOOTH host 114 is configured to obtain the second channel and timing information 133 from the BLUETOOTH controller 118 using dedicated signaling. For example, the BLUETOOTH host 114 may be configured to send a message 140 to the BLUETOOTH controller 118 to pull the second channel and timing information 133. For example, the BLUETOOTH host 114 may send the message 140 that includes a pull instruction 138 to the BLUETOOTH controller 118 to cause the BLUETOOTH controller 118 to send the message 142 to the BLUETOOTH host 114. In these examples, the one or more processors 106 are configured to cause the BLUETOOTH controller 118 to send the message 142 to the BLUETOOTH host 114 responsive to the BLUETOOTH controller 118 receiving the message 140.

Alternatively or additionally, in examples in which the one or more processors 106 are configured to cause the BLUETOOTH host 114 to obtain the second channel and timing information 133 from the BLUETOOTH controller 118, the BLUETOOTH controller 118 is configured to send the message 142 responsive to triggering criteria. For example, the one or more processors 106 may be configured such that the BLUETOOTH controller 118 stores triggering criteria corresponding to one or more trigger events, monitors for occurrence of the one or more trigger events, and sends the message 142 to the BLUETOOTH host 114 responsive to determining that at least one of the one or more trigger events has occurred. In some examples, the trigger events may include scheduling and un-scheduling a broadcast transmission, transmission of location sync information, and/or transmission or reception of a service request.

In some examples in which the BLUETOOTH controller 118 is configured to obtain the second channel and timing information 133, the one or more processors 106 are further configured to cause the BLUETOOTH host 114 or the BLUETOOTH application 112 to determine the first channel and timing information 124 based on the second channel and timing information 133. For example, the BLUETOOTH host 114 and/or the BLUETOOTH application 112 may be configured to process the scheduling data 132 to determine a frequency and time for transmission of the data 128 that does not conflict with any scheduled transmissions based on the second channel and timing information 133 in the scheduling data 132. The BLUETOOTH host 114 and/or the BLUETOOTH application 112 may then generate the first channel and timing information 124 based on the determined frequency and time. In these examples, because the BLUETOOTH host 114 and/or the BLUETOOTH application 112 is aware of scheduled transmission information in advance of generating the first channel and timing information 124, the BLUETOOTH host 114 and/or BLUETOOTH application 112 is enabled to generate, select, and/or determine the first channel and timing information 124 for transmission of the data 128 such that the data 128 is transmitted on a channel and at a time the does not conflict with other transmissions.

Although FIG. 1 depicts the BLUETOOTH device 100 as being configured to enable the BLUETOOTH host 114 to obtain the second channel and timing information 133 from the BLUETOOTH controller 118, in some examples, the BLUETOOTH device 100 is not configured to enable the BLUETOOTH host 114 to obtain the second channel and timing information 133. In examples in which the BLUETOOTH host 114 is not configured to obtain the second channel and timing information 133, the BLUETOOTH controller 118 is not configured to send the message 142, the BLUETOOTH host 114 is not configured to send the message 140, and the BLUETOOTH controller 118 is not configured to store the trigger criteria.

Figure 2:
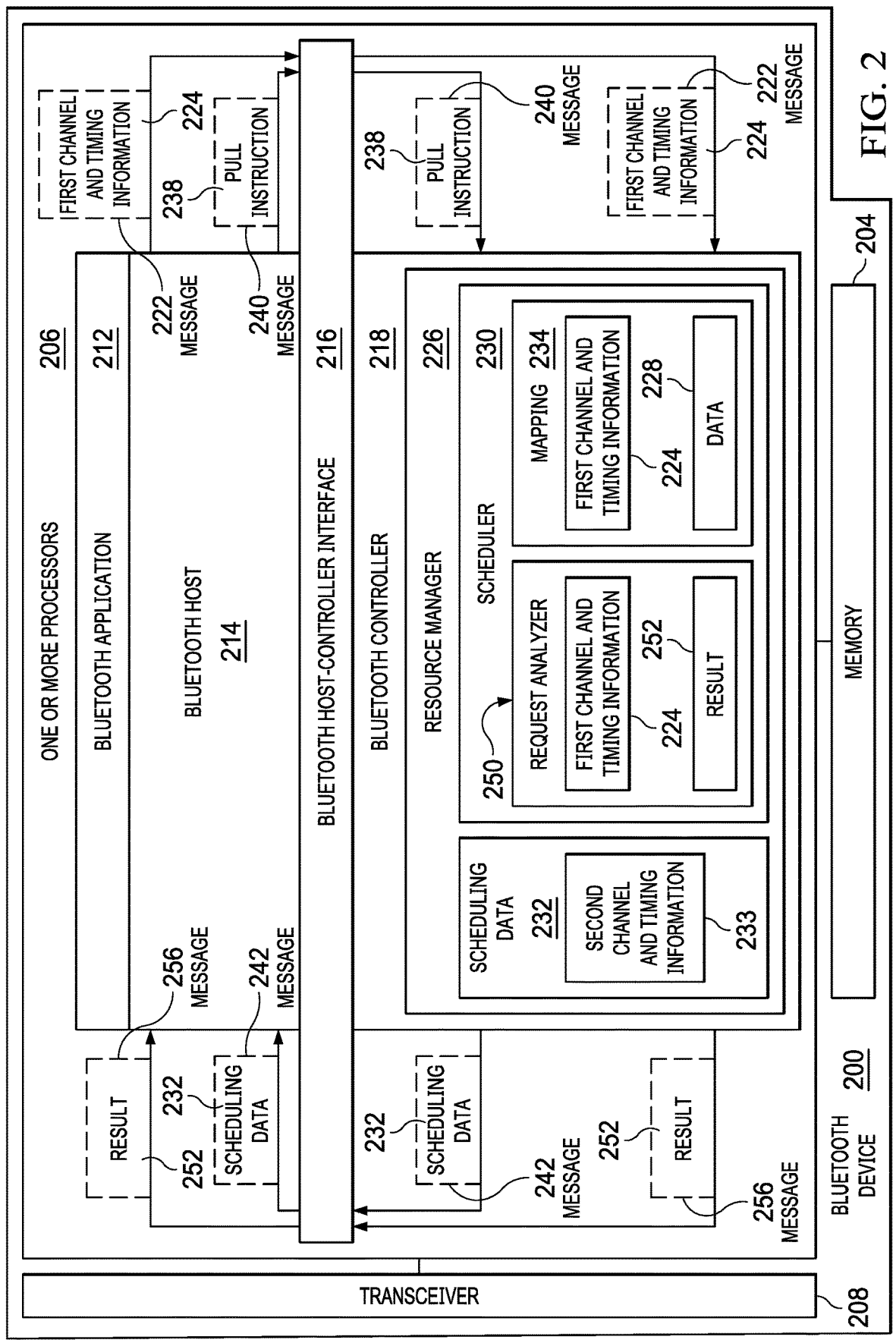
FIG. 2 is a block diagram of a BLUETOOTH device in accordance with various examples.

FIG. 2 depicts an example of a BLUETOOTH (e.g., BLE) device 200 (e.g., a device configured with BLUETOOTH communication capability) according to some examples of this disclosure in which a BLUETOOTH host 214 is configured to communicate with a BLUETOOTH controller 218 to request the BLUETOOTH controller 218 to send data of a BLUETOOTH application 212 according to channel and timing information. The BLUETOOTH device 200 includes a transceiver 208, memory 204, and one or more processors 206 coupled to the transceiver 208 and the memory 204.

The one or more processors 206 are configured to implement the BLUETOOTH host 214, a BLUETOOTH host-controller interface, and the BLUETOOTH controller 218. The one or more processors 206 may include one or more chips. For example, the one or more processors 206 may include a first chip in which the BLUETOOTH host 214, BLUETOOTH controller 218, and BLUETOOTH host-controller interface are implemented, and a second chip in which the BLUETOOTH application 212 is implemented. Alternatively, the one or more processors 206 may implement the BLUETOOTH host 214, BLUETOOTH controller 218, BLUETOOTH host-controller interface, and BLUETOOTH application 212 on a single chip.

The BLUETOOTH application 212 may be any application configured to use BLUETOOTH. The BLUETOOTH application 212 may be above the BLUETOOTH host 214 according to the BLUETOOTH hierarchy of components. The BLUETOOTH application 212 may desire to send data 228 to one or more other devices.

The BLUETOOTH host 214 may be above the BLUETOOTH host-controller interface 216 according to the BLUETOOTH hierarchy of components. The BLUETOOTH host 214 is configured to send a message 222 to the BLUETOOTH controller 218 via the BLUETOOTH host-controller interface 216. The message 222 requests that the data 228 be transmitted at a particular time and on a particular frequency, and includes first channel and timing information 224. For example, the first channel and timing information 224 may specify a particular data channel (e.g., frequency) on which the BLUETOOTH host 214 requests to send the data 228, and may specify a particular time at which the BLUETOOTH host 214 requests to send the data 228 on the particular data channel. In some examples, the first channel and timing information 224 in the message 222 is derived from channel and timing information provided to the BLUETOOTH host 214 from the BLUETOOTH application 212. For example, the BLUETOOTH application 212 may send a message (not illustrated) to the BLUETOOTH host 214 that indicates that the BLUETOOTH application 212 would like to send the data 228 at the particular time and on the particular channel.

The BLUETOOTH controller 218 may be below the BLUETOOTH host 214 according to the BLUETOOTH hierarchy of components, and may be configured to communicate with the BLUETOOTH host 214 via the BLUETOOTH host-controller interface 216 (e.g., as described in the BLUETOOTH Core Specification v 5.2). The BLUETOOTH controller 218 includes a request analyzer 250 configured to determine whether to approve sending the data 228 according to the first channel and timing information 224. In some examples, the request analyzer 250 is included within a scheduler 230 of a resource manager 226 within the BLUETOOTH controller 218; however, the request analyzer 250 may be implemented using or within a component of the BLUETOOTH controller 218 other than the scheduler 230 and/or the resource manager 226.

In some examples, the request analyzer 250 is configured to determine whether to approve sending the data 228 according to the first channel and timing information 224 based on whether sending the data 228 according to the first channel and timing information 224 would result 252 in a conflict with other scheduled transmissions. In these examples, the request analyzer 250 is configured to obtain the scheduling data 232 and determine whether sending the data 228 on the channel and at the time indicated in the first channel and timing information 224 would result 252 in a conflict. For example, the request analyzer 250 may obtain scheduling information regarding each scheduled transmission from the scheduling data 232, and determine whether any scheduled transmissions included in the scheduling data 232 are scheduled to occur at the time and on the channel indicated by the first channel and timing information 224.

The request analyzer 250 is configured to generate a result 252 corresponding to approving or denying the request in the message 222. For example, the request analyzer 250 may determine that there is no conflict between scheduled transmissions and sending the data 228 at the first time on the first channel, and may generate the result 252. In this example, the result 252 corresponds to approving the request in the message 222. As another example, the request analyzer 250 may determine that there is a conflict between scheduled transmissions and sending the data 228 at the first time on the first channel, and may generate the result 252. In this example, the result 252 corresponds to denying the request in the message 222.

The BLUETOOTH controller 218 is configured send, to the BLUETOOTH host 214 via the BLUETOOTH host-controller interface, an indication of whether the BLUETOOTH controller 218 approves sending the data 228 according to the first channel and timing information 224. For example, the BLUETOOTH controller 218 is configured to send the BLUETOOTH host 214 a message 256 that includes the result 252.

When the result 252 corresponds to denying the request in the message 222, the BLUETOOTH controller 218 is configured not to initiate sending the data 228 based on the first channel and timing information 224.

In some examples, when the result 252 corresponds to denying the request in the message 222, the BLUETOOTH controller 218 is further configured to determine alternative timing and/or channel(s) that may be used to send the data 228. For example, the BLUETOOTH controller 218 may be aware of timing gaps between scheduled events, and may determine one or more available (e.g., unscheduled) time slot and/or recommended channel that would result in using gaps between scheduled or used slots. Alternatively or additionally, in some examples, the BLUETOOTH controller 218 is further configured to determine the alternative timing and/or channel(s) based on one or more of the following considerations: 1) device or network power optimization; 2) device or network activity time minimization; 3) device responsiveness limitation and optimization; and 4) implementation limitations.

In some examples in which the BLUETOOTH controller 218 is configured to determine alternative timing and/or channel(s) that may be used to send the data 228, the BLUETOOTH controller 218 is further configured to propose the alternative timing and/or recommended channel(s) to the BLUETOOTH host 214 and obtain approval from the BLUETOOTH host 214 to send the data 228 according to the proposed alternative timing and/or channel(s) before sending the data 228 according to the alternative timing and/or channel(s). In these examples, the BLUETOOTH controller 218 is configured to send information indicating the proposed alternative timing and/or recommended channel(s) to the BLUETOOTH host 214 to enable the BLUETOOTH host 214 and/or the BLUETOOTH application 212 to determine whether to use the alternative timing and/or recommended channel(s) to send the data 228. For example, the BLUETOOTH controller 218 may include the alternative timing and/or recommended channels(s) in the message 256. The BLUETOOTH host 214 is configured to receive the alternative timing and/or recommended channel(s) from the BLUETOOTH controller 218. The BLUETOOTH host 214 is configured to select an alternative time and/or channel (e.g., "selected time and/or channel") for sending the data 228 based on the alternative timing and/or recommended channel(s) in the message 256. The alternative time and/or channel is different than the time and/or channel indicated in the first channel and timing information 224, and may be based on or correspond to the timing and/or channel(s) proposed by the BLUETOOTH controller 218. The BLUETOOTH host 214 is configured to send the BLUETOOTH controller 218 a selected timing and channel message [not illustrated] including the selected time and/or channel.

Alternatively or additionally, in some examples in which the BLUETOOTH controller 218 is configured to determine alternative timing and/or channel(s), the BLUETOOTH controller 218 is configured to select an alternative timing and/or channel and send the data 228 using the alternative timing and/or channel to send the data 228 without sending the alternative timing and/or channel(s) to the BLUETOOTH host 214 for approval prior to the transmission. In these examples, the BLUETOOTH controller 218 is configured to send a message [not illustrated] to the BLUETOOTH host 214 indicating the alternative timing and/or channel(s) used to send the data 228.

When the result 252 corresponds to approving the request in the message 222, the BLUETOOTH controller 218 is configured to initiate sending the data 228 based on the first channel and timing information 224. In some examples, initiating sending the data 228 based on the first channel and timing information 224 includes scheduling transmission of the data 228 according to the first channel and timing information 224. For instance, in the example illustrated in FIG. 2, the BLUETOOTH controller 218 includes a resource manager 226 (e.g., a baseband resource manager) responsible for scheduling transmission of packets. In the example illustrated in FIG. 2, the resource manager 226 includes a scheduler 230 responsible for scheduling data for transmission on a particular channel and at a particular time based on the first channel and timing information 224. In the example illustrated in FIG. 2, in order to schedule the data 228 for transmission based on the first channel and timing information 224, the scheduler 230 is configured to receive the first channel and timing information 224 and map the data to a particular frequency and transmission time indicated by the first channel and timing information 224. For example, the scheduler 230 is configured to generate and/or store a mapping 234 that maps the data 228 to the particular frequency and transmission time indicated by the first channel and timing information 224. The scheduler 230 is further configured to provide a scheduler signal to cause the BLUETOOTH controller 218 to transmit the data 228 according to the mapping 234 (e.g., on the particular frequency and at the transmission time). For example, the scheduler signal may identify or correspond to the particular frequency, and may be output by the scheduler 230 (e.g., to another component in the Link Layer of the BLUETOOTH controller 218) at a time configured to cause the BLUETOOTH controller 218 to transmit the data according to the mapping 234. The BLUETOOTH controller 218 is configured to generate a packet including the data 228 and subsequently transmit the data 228 on the particular frequency and at the transmission time based on the scheduler signal using any technique, such as the transmission process described in BLUETOOTH Core Specification v 5.2.

Accordingly, when the BLUETOOTH controller 218 approves the request in the message 222 from the BLUETOOTH host 214, the BLUETOOTH controller 218 is configured to transmit the data 228 according to the channel and timing information requested by the BLUETOOTH host 214 (and in some examples additionally based on a request from the BLUETOOTH application 212). Since the BLUETOOTH controller 218 notifies the BLUETOOTH host 214 (via message 256) that the request is approved and transmits the data 228 according to the channel and timing information request by the BLUETOOTH host 214 (and in some examples additionally based on a request from the BLUETOOTH application 212), the BLUETOOTH host 214 (and in some examples the BLUETOOTH application 212) is/are aware of channel and timing information that will be used to transmit the data 228.

In some examples, the BLUETOOTH controller 218 is further configured to send the BLUETOOTH host 214 a message [not illustrated] indicating whether the event (e.g., transmission of the data 128) was conducted successfully or unsuccessfully.

The BLUETOOTH host 214 (and in some examples the BLUETOOTH application 212) being aware of the channel and timing information that will be used to transmit the data 228 enables the BLUETOOTH host 214 and/or BLUETOOTH application 212 to provide channel and timing information to one or more other devices, which may use the channel and timing information to perform services. For example, the BLUETOOTH host 214 and/or BLUETOOTH application 212 may be configured to cause the BLUETOOTH device 200 provide the first channel and timing information 224 to one or more other devices as described below with reference to FIG. 3.

Additionally or alternatively, in some examples, the one or more processors 206 are further configured to cause the BLUETOOTH host 214 to obtain, from the BLUETOOTH controller 218, second channel and timing information 233 of one or more scheduled transmissions. For example, the scheduler 230 may maintain scheduling data 232 that includes the second channel and timing information 233, and the second channel and timing information 233 may include scheduling information that indicates a frequency of each scheduled transmission, a time at which each scheduled transmission will begin, and/or a duration of each scheduled transmission. In some of these examples, the BLUETOOTH controller 218 is configured to send a message 242 to the BLUETOOTH host 214 that includes the scheduling data 232 (and the second channel and timing information 233). In some of these examples, the BLUETOOTH host 214 is configured to send the scheduling data 232 to the BLUETOOTH application 212.

In some examples in which the one or more processors 206 are configured to cause the BLUETOOTH host 214 to obtain the second channel and timing information 233 from the BLUETOOTH controller 218, the BLUETOOTH host 214 is configured to obtain the second channel and timing information 233 from the BLUETOOTH controller 218 using dedicated signaling. For example, the BLUETOOTH host 214 may be configured to send a message 240 to the BLUETOOTH controller 218 to pull the second channel and timing information 233. For example, the BLUETOOTH host 214 may send the message 240 that includes a pull instruction 238 to the BLUETOOTH controller 218 to cause the BLUETOOTH controller 218 to send the message 242 to the BLUETOOTH host 214. In these examples, the one or more processors 206 are configured to cause the BLUETOOTH controller 218 to send the message 242 to the BLUETOOTH host 214 responsive to the BLUETOOTH controller 218 receiving the message 240.

Alternatively or additionally, in examples in which the one or more processors 206 are configured to cause the BLUETOOTH host 214 to obtain the second channel and timing information 233 from the BLUETOOTH controller 218, the BLUETOOTH controller 218 is configured to send the message 242 responsive to triggering criteria. For example, the one or more processors 206 may be configured such that the BLUETOOTH controller 218 stores triggering criteria corresponding to one or more trigger events, monitors for occurrence of the one or more trigger events, and sends the message 242 to the BLUETOOTH host 214 responsive to determining that at least one of the one or more trigger events has occurred. In some examples, the trigger events may include scheduling and un-scheduling a broadcast transmission, transmission of location sync information, and/or transmission or reception of a service request.

In some examples in which the BLUETOOTH controller 218 is configured to obtain the second channel and timing information 233, the one or more processors 206 are further configured to cause the BLUETOOTH host 214 or the BLUETOOTH application 212 to determine the first channel and timing information 224 based on the second channel and timing information 233. For example, the BLUETOOTH host 214 and/or the BLUETOOTH application 212 may be configured to process the scheduling data 232 to determine a frequency and time for transmission of the data 228 that does not conflict with any scheduled transmissions based on the second channel and timing information 233 in the scheduling data 232. The BLUETOOTH host 214 and/or the BLUETOOTH application 212 may then generate the first channel and timing information 224 based on the determined frequency and time. In these examples, because the BLUETOOTH host 214 and/or the BLUETOOTH application 212 is aware of scheduled transmission information in advance of generating the first channel and timing information 224, the BLUETOOTH host 214 and/or BLUETOOTH application 212 is enabled to generate, select, and/or determine the first channel and timing information 224 for transmission of the data 228 such that the data 228 is transmitted on a channel and at a time the does not conflict with other transmissions.

Although FIG. 2 depicts the BLUETOOTH device 200 as being configured to enable the BLUETOOTH host 214 to obtain the second channel and timing information 233 from the BLUETOOTH controller 218, in some examples, the BLUETOOTH device 200 is not configured to enable the BLUETOOTH host 214 to obtain the second channel and timing information 233. In examples in which the BLUETOOTH host 214 is not configured to obtain the second channel and timing information 233, the BLUETOOTH controller 218 is not configured to send the message 242, the BLUETOOTH host 214 is not configured to send the message 240, and the BLUETOOTH controller 218 is not configured to store the trigger criteria.

Figure 3:
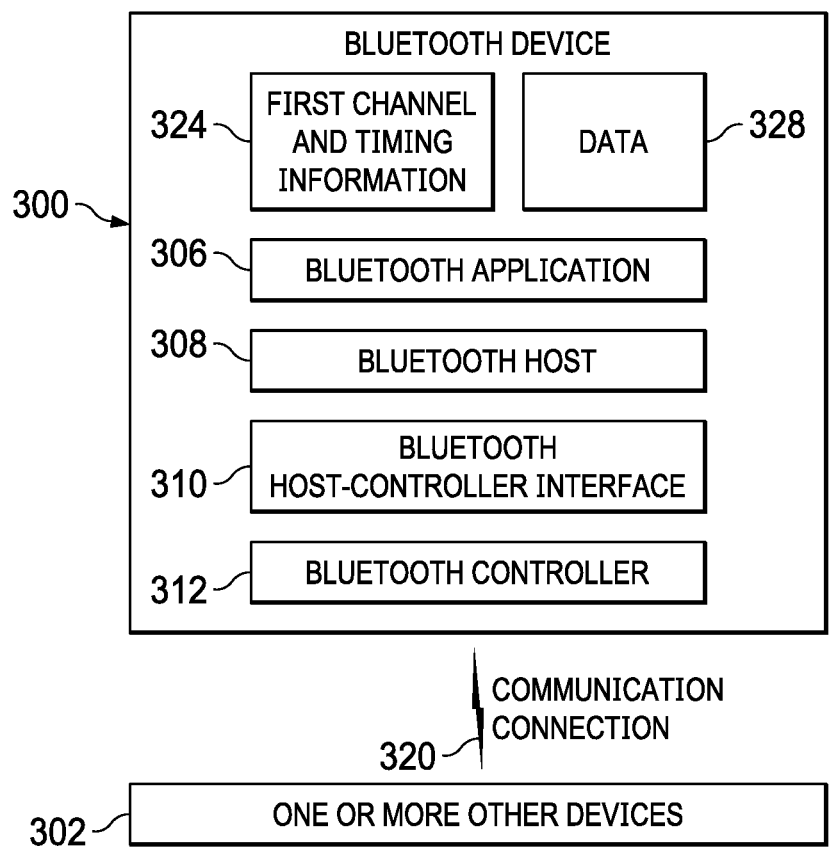
FIG. 3 is a diagram of a BLUETOOTH device configured to communicate with one or more other devices in accordance with various examples.

FIG. 3 depicts an example of a BLUETOOTH device 300 (e.g., a BLE device) communicatively coupled to one or more other devices 302 via communication connection 320. The one or more other devices 302 include any device configured to communicate with the BLUETOOTH device 300. The communication connection 320 may be any connection medium, link, or connection, such as a wired or wireless communication connection.

The BLUETOOTH device 300 includes a BLUETOOTH application 306, a BLUETOOTH host 308, a BLUETOOTH host-controller interface 310, and a BLUETOOTH controller 312.

In some examples, the BLUETOOTH device 300 of FIG. 3 corresponds to, includes the components of, and is configured as described above with reference to the BLUETOOTH device 100 of FIG. 1. For example, the BLUETOOTH application 306 may correspond to the BLUETOOTH application 112 of FIG. 1, the BLUETOOTH host 308 may correspond to the BLUETOOTH host 114 of FIG. 1, the BLUETOOTH host-controller interface 310 may correspond to the BLUETOOTH host-controller interface 116 of FIG. 1, and the BLUETOOTH controller 312 may correspond to the BLUETOOTH controller 118 of FIG. 1.

In other examples, the BLUETOOTH device 300 of FIG. 3 corresponds to, includes the components of, and is configured as described above with reference to, the BLUETOOTH device 200 of FIG. 2. For example, the BLUETOOTH application 306 may correspond to the BLUETOOTH application 212 of FIG. 2, the BLUETOOTH host 308 may correspond to the BLUETOOTH host 214 of FIG. 2, the BLUETOOTH host-controller interface 310 may correspond to the BLUETOOTH host-controller interface 216 of FIG. 2, and the BLUETOOTH controller 312 may correspond to the BLUETOOTH controller 218 of FIG. 2.

Thus, references herein to the BLUETOOTH device 300 of FIG. 3 may be considered as references to the BLUETOOTH device 100 of FIG. 1 and/or the BLUETOOTH device 200 of FIG. 2.

The BLUETOOTH device 300 is configured to provide the BLUETOOTH controller 312 first channel and timing information 324. The first channel and timing information 324 may correspond to the first channel and timing information 124 of FIG. 1 and/or the first channel and timing information 224 of FIG. 2, and may be provided to the BLUETOOTH controller 312 as described above with reference to FIGS. 1 and/or 2. The BLUETOOTH device 300 is configured to provide the first channel and timing information 324 to the one or more other devices 302, which may use the first channel and timing information 324 to perform services.

For example, the BLUETOOTH device 300 may be configured to provide the first channel and timing information 324 to a connection monitor, and the connection monitor may be configured to process the first channel and timing information 324: 1) to synchronize the recaption of the transition by multiple devices; 2) to schedule and unschedule (out of order) broadcast transmission(s); 3) for transmission of location sync information; 4) for transmission of service request(s); and/or 5) for transmission of device discovery.

Additionally or alternatively, BLUETOOTH device 300 may be configured to transmit an indication that the BLUETOOTH device 300 plans to transmit the data 328 (e.g., the data 128 of FIG. 1 or the data 228 of FIG. 2) according to the first channel and timing information 324. For example, the BLUETOOTH controller 312 may be configured to transmit, using the transceiver 108 of FIG. 1 or the transceiver 208 of FIG. 2, the first channel and timing information 324 (e.g., using a unicast or multicast broadcast) to the one or more other devices 302 in advance of sending the data 328 according to the first channel and timing information 324. In these examples, the one or more other devices 302 receive the first channel and timing information 324, and may tune to the particular frequency and at the time indicated by the first channel and timing information 324 in order to receive the data 328.

Figure 4:
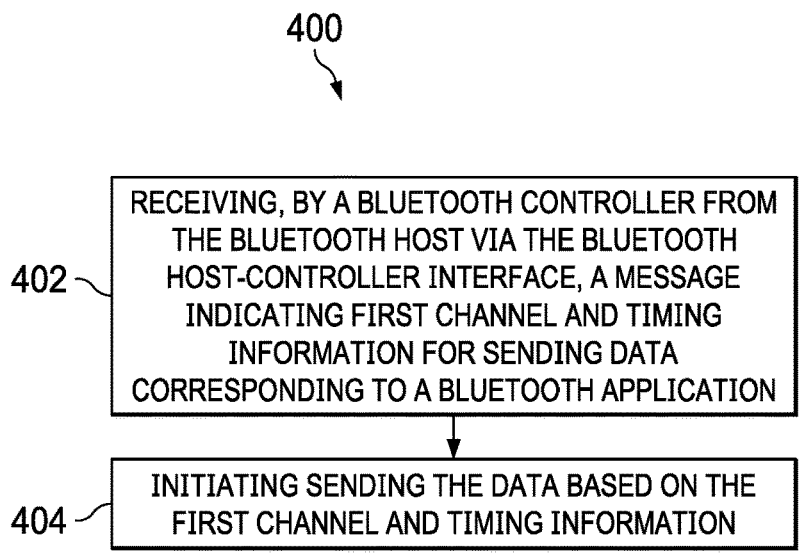
FIG. 4 is a flow diagram of a method implemented by a BLUETOOTH device in accordance with various examples.

FIG. 4 depicts a flowchart of a method 400 performed by a BLUETOOTH device. In some examples, the method 400 is implemented by the BLUETOOTH device 100 of FIG. 1 and/or the BLUETOOTH device 300 of FIG. 3.

The method 400 includes, at 402, receiving, by a BLUETOOTH controller from a BLUETOOTH host via BLUETOOTH host-controller interface, a message indicating first channel and timing information for sending data corresponding to a BLUETOOTH application. For example, the BLUETOOTH controller may correspond to the BLUETOOTH controller 118 of FIG. 1, the BLUETOOTH host may correspond to the BLUETOOTH host 114 of FIG. 1, the BLUETOOTH host-controller interface may correspond to the BLUETOOTH host-controller interface 116 of FIG. 1, the first channel and timing information may correspond to the first channel and timing information 124 of FIG. 1, the message may correspond to the message 122 of FIG. 1, and the BLUETOOTH controller 118 may receive the message 122 as described above with reference to FIG. 1.

The method 400 further includes, at 404, initiating sending the data according to the first channel and timing information. For example, the BLUETOOTH controller 118 may include the scheduler 130 of FIG. 1, and the scheduler 130 may schedule transmission of the data 128 as described above with reference to FIG. 1. For example, the BLUETOOTH controller 118 may implement the resource manager 126 described above with reference to FIG. 1, and the resource manager 126 may map the data 128 to the first channel and timing information 124.

In some examples, the method 400 further includes pulling, by the BLUETOOTH host from the BLUETOOTH controller using dedicated signaling, second channel and timing information of one or more scheduled transmissions. For example, the second channel and timing information may correspond to the second channel and timing information 133 of FIG. 1, the BLUETOOTH host 114 of FIG. 1 may send the BLUETOOTH controller 118 of FIG. 1 the message 140, and the BLUETOOTH controller 118 of FIG. 1 may send the BLUETOOTH host 114 the message 142 including the second channel and timing information 133. In some examples, the second channel and timing information specifies, for each scheduled transmission of the one or more scheduled transmissions, a channel to be used for the scheduled transmission, a start time of the scheduled transmission, and a duration of the scheduled transmission.

In some examples, the method 400 further includes the BLUETOOTH host or the BLUETOOTH application determining the first channel and timing information based on the second channel and timing information. For example, the BLUETOOTH host 114 of FIG. 1 or the BLUETOOTH application 112 of FIG. 1 may determine the first channel and timing information 124 based on the second channel and timing information 133 to avoid conflict with scheduled transmissions as described above with reference to FIG. 1.

In some examples, the method 400 further includes BLUETOOTH device transmitting an indication that the BLUETOOTH device plans to transmit the data according to the first channel and timing information. For example, the BLUETOOTH device 100 of FIG. 1 and/or the BLUETOOTH device 300 of FIG. 3 may transmit the first channel and timing information 124 to one or more other devices (e.g., the one or more other devices 302 in FIG. 3) in advance of the BLUETOOTH device 100 of FIG. 1 sending the data 128 as described above with reference to the BLUETOOTH device 300 of FIG. 3.

Figure 5:
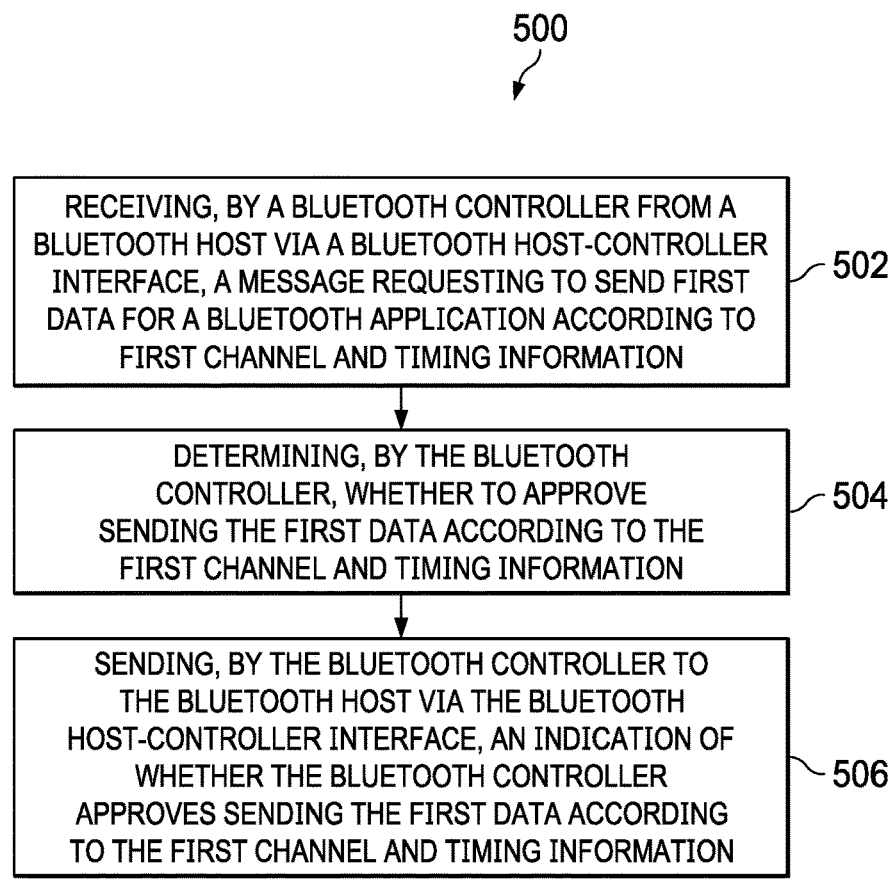
FIG. 5 is a flow diagram of a method implemented by a BLUETOOTH device, in accordance with various examples.

FIG. 5 depicts a flowchart of a method 500 performed by a BLUETOOTH device. In some examples, the method 500 is implemented by the BLUETOOTH device 200 of FIG. 2 and/or the BLUETOOTH device 300 of FIG. 3.

The method 500 includes, at 502, receiving, by a BLUETOOTH controller from a BLUETOOTH host via a BLUETOOTH host-controller interface, a message requesting to send first data for a BLUETOOTH application according to first channel and timing information. For example, the BLUETOOTH controller may correspond to the BLUETOOTH controller 218 of FIG. 2, the BLUETOOTH host may correspond to the BLUETOOTH host 214 of FIG. 2, the BLUETOOTH host-controller interface may correspond to the BLUETOOTH host-controller interface 216 of FIG. 2, the message may correspond to the message 222 of FIG. 2, the first channel and timing information may correspond to the first channel and timing information 224 of FIG. 2, and the BLUETOOTH controller 218 may receive the message 222 as described above with reference to FIG. 2.

The method 500 further includes, at 504, determining, by the BLUETOOTH controller, whether to approve sending the first data according to the first channel and timing information. For example, the BLUETOOTH controller 218 of FIG. 2 may determine whether to approve sending the data 228 according to the first channel and timing information 224 as described above with reference to FIG. 2.

The method 500 further includes, at 506, sending, by the BLUETOOTH controller to the BLUETOOTH host, via the BLUETOOTH host-controller interface, an indication of whether the BLUETOOTH controller approves sending the first data according to the first channel and timing information. For example, the BLUETOOTH controller 218 of FIG. 2 may generate the result 252 of FIG. 2 as described above with reference to FIG. 2, and may send the message 256 of FIG. 2 including the result 252 to the BLUETOOTH host 214 via the BLUETOOTH host-controller interface 216 as described above with reference to FIG. 2.

The method 500 may further include scheduling, by the BLUETOOTH controller, transmission of the data according to the first channel and timing information when the BLUETOOTH controller approves sending the data according to the first channel and timing information. For example, the BLUETOOTH controller 218 of FIG. 2 may include the scheduler 230 described above with reference to FIG. 2, and the scheduler 230 may schedule transmission of the data 228 as described above with reference to FIG. 2.

In some examples, the method 500 further includes pulling, by the BLUETOOTH host from the BLUETOOTH controller using dedicated signaling, second channel and timing information of one or more scheduled transmissions. For example, the second channel and timing information may correspond to the second channel and timing information 233 of FIG. 2, the BLUETOOTH host 214 of FIG. 2 may send the BLUETOOTH controller 218 of FIG. 2 the message 240, and the BLUETOOTH controller 218 of FIG. 2 may send the BLUETOOTH host 214 the message 242 including the second channel and timing information 233. In some examples, the second channel and timing information specifies, for each scheduled transmission of the one or more scheduled transmissions, a channel to be used for the scheduled transmission, a start time of the scheduled transmission, and a duration of the scheduled transmission.

In some examples, the method 500 further includes the BLUETOOTH host or the BLUETOOTH application determining the first channel and timing information based on the second channel and timing information. For example, the BLUETOOTH host 214 of FIG. 2 or the BLUETOOTH application 212 of FIG. 2 may determine the first channel and timing information 224 of FIG. 2 based on the second channel and timing information 233 of FIG. 2 to avoid conflict with scheduled transmissions as described above with reference to FIG. 2.

In some examples, the method 500 further includes the BLUETOOTH device transmitting an indication that the BLUETOOTH device plans to transmit the data according to the first channel and timing information. For example, the BLUETOOTH device 200 of FIG. 2 and/or the BLUETOOTH device 300 of FIG. 3 may transmit the first channel and timing information 224 of FIG. 2 to one or more other devices in advance of the BLUETOOTH device 200 of FIG. 2 or the BLUETOOTH device 300 of FIG. 3 sending the data 228 as described above with reference to the BLUETOOTH device 300 of FIG. 3.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device or processor or BLUETOOTH layer (e.g., a BLUETOOTH controller) that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement.

Modifications are possible in the described examples, and other examples are possible within the scope of the claims.

What is claimed is:

1. A BLUETOOTH device, comprising:
memory; and
one or more processors coupled to the memory and configured to implement a BLUETOOTH host, a BLUETOOTH host-controller interface, and a BLUETOOTH controller, wherein the one or more processors are further configured to cause the BLUETOOTH controller to:
receive, from the BLUETOOTH host via the BLUETOOTH host-controller interface, a message indicating first channel and timing information for sending data corresponding to a BLUETOOTH application; and
initiate sending the data based on the first channel and timing information.

2. The BLUETOOTH device of claim 1, wherein the one or more processors are further configured to cause the BLUETOOTH host to pull, from the BLUETOOTH controller using dedicated signaling, second channel and timing information of one or more scheduled transmissions.

3. The BLUETOOTH device of claim 2, wherein the one or more processors are further configured to cause the BLUETOOTH host or the BLUETOOTH application to determine the first channel and timing information based on the second channel and timing information.

4. The BLUETOOTH device of claim 3, wherein the second channel and timing information specifies, for each scheduled transmission of the one or more scheduled transmissions, a channel to be used for the scheduled transmission, a start time of the scheduled transmission, or a duration of the scheduled transmission.

5. The BLUETOOTH device of claim 4, wherein the one or more processors are configured to cause the BLUETOOTH host or the BLUETOOTH application to determine the first channel and timing information to avoid conflict with the one or more scheduled transmissions based on the second channel and timing information.

6. The BLUETOOTH device of claim 1, wherein the one or more processors are further configured to cause the BLUETOOTH device to transmit an indication to another device that the BLUETOOTH device is configured to transmit the data according to the first channel and timing information.

7. The BLUETOOTH device of claim 1, wherein the one or more processors are configured to cause the BLUETOOTH controller to implement a resource manager that maps transmission of the data to the first channel and timing information.

8. The BLUETOOTH device of claim 1, wherein the BLUETOOTH host, the BLUETOOTH host-controller interface, and the BLUETOOTH controller are implemented in a first chip, and the BLUETOOTH application is implemented in a second chip.

9. The BLUETOOTH device of claim 1, wherein the first channel is a data channel.

10. The BLUETOOTH device of claim 1, wherein the one or more processors are further configured to:
in response to a triggering event, send, by the BLUETOOTH controller to the BLUETOOTH host, a second message including an indication of a second channel and timing information; and
determine, by the BLUETOOTH host, the first channel and timing information based on the second channel and timing information.

11. The BLUETOOTH device of claim 10, wherein the triggering event includes:
scheduling a broadcast transmission;
un-scheduling a broadcast transmission;
a transmission of location sync information; or
a transmission or reception of a service request.

12. The BLUETOOTH device of claim 1, wherein the one or more processors are further configured to:
cause the BLUETOOTH device to transmit to another device an indication of the first channel and the timing information; and
initiate sending the data based on the first channel and timing information.

13. A BLUETOOTH device, comprising:
memory; and
one or more processors coupled to the memory and configured to implement a BLUETOOTH host, a BLUETOOTH host-controller interface, and a BLUETOOTH controller, wherein the one or more processors are further configured to cause the BLUETOOTH controller to:
receive, from the BLUETOOTH host via the BLUETOOTH host-controller interface, a message requesting to send first data for a BLUETOOTH application according to first channel and timing information;
determine whether to approve sending the first data according to the first channel and timing information; and
send, to the BLUETOOTH host via the BLUETOOTH host-controller interface, an indication of whether the BLUETOOTH controller approves sending the first data according to the first channel and timing information.

14. The BLUETOOTH device of claim 13, wherein the one or more processors are further configured to cause the BLUETOOTH host to pull, from the BLUETOOTH controller using dedicated signaling, second channel and timing information of one or more scheduled transmissions.

15. The BLUETOOTH device of claim 14, wherein the one or more processors are further configured to cause the BLUETOOTH host or the BLUETOOTH application to determine the first channel and timing information based on the second channel and timing information.

16. The BLUETOOTH device of claim 15, wherein the second channel and timing information specifies, for each scheduled transmission of the one or more scheduled transmissions, a channel to be used for the scheduled transmission, a start time of the scheduled transmission, and a duration of the scheduled transmission.

17. The BLUETOOTH device of claim 16, wherein the one or more processors are configured to cause the BLUETOOTH host or the BLUETOOTH application to determine the first channel and timing information to avoid conflict with the one or more scheduled transmissions based on the second channel and timing information.

18. The BLUETOOTH device of claim 13, wherein the one or more processors are further configured to cause the BLE controller to schedule transmission of the first data according to the first channel and timing information when the BLUETOOTH controller approves sending the first data according to the first channel and timing information.

19. A method, comprising:
receiving, by a BLUETOOTH controller of a BLUETOOTH device from a BLUETOOTH host of the BLUETOOTH device via a BLUETOOTH host-controller interface of the BLUETOOTH device, a message indicating first channel and timing information for sending data corresponding to a BLUETOOTH application; and initiating, by the BLUETOOTH controller, sending the data based on the first channel and timing information.

20. The method of claim 19, further comprising pulling, by the BLUETOOTH host from the BLUETOOTH controller using dedicated signaling, second channel and timing information of one or more scheduled transmissions.

21. The method of claim 20, further comprising determining, by the BLUETOOTH host, the first channel and timing information based on the second channel and timing information.

22. The method of claim 21, wherein the second channel and timing information specifies, for each scheduled transmission of the one or more scheduled transmissions, a channel to be used for the scheduled transmission, a start time of the scheduled transmission, and a duration of the scheduled transmission.

23. The method of claim 22, further comprising determining, by the BLUETOOTH host, the first channel and timing information to avoid conflict with the one or more scheduled transmissions based on the second channel and timing information.

24. The method of claim 19, further comprising transmitting, by the BLUETOOTH device, an indication to another device that the BLUETOOTH device is configured to transmit the data according to the first channel and timing information.

25. The method of claim 19, further comprising mapping, by the BLUETOOTH controller, the data to the first channel and timing information.

\* \* \* \* \*